(12) United States Patent
He

(10) Patent No.: US 12,442,945 B2
(45) Date of Patent: Oct. 14, 2025

(54) METHODS AND SYSTEMS FOR DETERMINING ATTENUATED TRAVELTIME USING PARALLEL PROCESSING

(71) Applicant: SAUDI ARABIAN OIL COMPANY, Dhahran (SA)

(72) Inventor: Yi He, Beijing (CN)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/554,894

(22) PCT Filed: Oct. 25, 2022

(86) PCT No.: PCT/CN2022/127200
§ 371 (c)(1),
(2) Date: Oct. 11, 2023

(87) PCT Pub. No.: WO2024/087002
PCT Pub. Date: May 2, 2024

(65) Prior Publication Data
US 2025/0093540 A1    Mar. 20, 2025

(51) Int. Cl.
*G01V 1/28* (2006.01)
*G01V 1/30* (2006.01)

(52) U.S. Cl.
CPC .............. *G01V 1/282* (2013.01); *G01V 1/303* (2013.01)

(58) Field of Classification Search
CPC ........ G01V 1/282; G01V 1/303; G01V 1/306; G01V 2210/614; G01V 2210/62;
(Continued)

(56) References Cited

U.S. PATENT DOCUMENTS 12,153,179 B2 * 11/2024 He ..................... G01V 1/306
2009/0095056 A1 * 4/2009 Dewald, III ........... G01N 25/56
73/61.77

(Continued)

FOREIGN PATENT DOCUMENTS

CN        103135132 A    6/2013
CN        106461810 A    2/2017
(Continued)

OTHER PUBLICATIONS

A. Shrestha et al., "Multi-level Domain-Decomposition Strategy for Solving the Eikonal Equation with the Fast-Sweeping Method", IEEE Transactions on Parallel and Distributed Systems, Apr. 2, 2018, vol. 29, No. 10, pp. 2297-2303 (9 pages).
(Continued)

*Primary Examiner* — Daniel Pihulic
(74) *Attorney, Agent, or Firm* — Osha Bergman Watanabe & Burton LLP

(57) ABSTRACT

Systems and methods are disclosed. The method includes obtaining seismic data for a geological region of interest, a velocity model, and an attenuation model. The seismic data includes an amplitude and a phase of seismic waves traveling from a seismic source location. The method further includes determining a traveltime model using the seismic source location, the velocity model, and a traveltime Eikonal function and determining an attenuated traveltime model using a parallel fast sweeping method. The parallel fast sweeping method includes Cuthill-McKee ordering a plurality of grid nodes. The plurality of grid nodes represents the geological region of interest. The parallel fast sweeping method further includes using the seismic source location, the velocity model, the attenuation model, the traveltime model, and an attenuated traveltime Eikonal function. The method still further includes generating an updated attenu- (Continued)

ation model using the attenuated traveltime model, the amplitude, and the phase.

20 Claims, 10 Drawing Sheets

(58) Field of Classification Search
CPC ....... G01V 2210/6222; G01V 2210/64; G01V 2210/673
See application file for complete search history.

(56) References Cited

U.S. PATENT DOCUMENTS

| | | | |
|---|---|---|---|
| 2009/0138245 | A1 | 5/2009 | Appleyard |
| 2010/0074053 | A1 | 3/2010 | Jaiswal et al. |
| 2011/0273961 | A1 | 11/2011 | Hu |
| 2012/0059639 | A1 | 3/2012 | Fung et al. |
| 2021/0079779 | A1 | 3/2021 | Valiveti et al. |
| 2022/0317325 | A1 | 10/2022 | Sun et al. |
| 2024/0184007 | A1* | 6/2024 | He ............ G01V 1/345 |
| 2025/0093540 | A1* | 3/2025 | He ............ G01V 1/306 |

FOREIGN PATENT DOCUMENTS

| | | | |
|---|---|---|---|
| CN | 107561585 | A | 1/2018 |
| CN | 109100786 | A | 12/2018 |
| CN | 110824564 | A | 2/2020 |
| CN | 111427081 | A | 7/2020 |
| CN | 112213774 | A | 1/2021 |
| CN | 112230284 | A | 1/2021 |
| CN | 113874760 | A | 12/2021 |
| CN | 114428276 | A | 5/2022 |
| WO | 2020191155 | A1 | 9/2020 |
| WO | WO-2024087002 | A1 * | 5/2024 ............ G01V 1/303 |

OTHER PUBLICATIONS

Y. Quan etal., Seismic attenuation tomography using the frequency shift method, Geophysics, 1997, vol. 62, pp. 895-905 (11 pages).

M. Cavalca et al., "Ray-based tomography for Q estimation and Q compensation in complex media", 81th Annual International Meeting, SEG, Expanded Abstracts, 2011, pp. 3989-3993 (5 pages).

C. Taillandier et al., "First-arrival traveltime tomography based on the adjoint-state method", Geophysics, 2009, vol. 74. pp. WCB57-WCB66 (10 pages).

M. Detrixhe et al., "A parallel fast sweeping method for the Eikonal equation", Journal of Computational Physics, 2013, vol. 237, pp. 46-55 (10 pages).

H Zhao, "Parallel implementations of the fast sweeping method", J. Comput. Math.,2007,vol. 25, pp. 421-429 (9 pages).

I. Henriksen et al., "Exploiting Asynchronous Priority Scheduling in Parallel Eikonal Solvers", Source: Published In: arXiv 2103.05694, Publication Date: Mar. 9, 2021, DOI: https://doi.org/10.48550/arXiv (21 pages).

P. Tong, "Adjoint-state Traveltime Tomography: Eikonal Equation-based Methods and Application to the Anza Area in Southern California", Source: Published In: JGR Solid Earth, vol. 126, No. 5, e2021JB021818, Publication Date: Apr. 27, 2021, DOI: https://doi.org/10.1029/2021JB021818 (22 pages).

M. Detrixhe et al., "Hybrid massively parallel fast sweeping method for static Hamilton-Jacobi equations", Journal of Computational Physics, 2016, vol. 322, pp. 199-223 (25 pages).

Y. He, "Parallel Fast Sweeping Method for Computing Seismic Attenuated Time", 83rd EAGE Annual Conference & Exhibition in Madrid Spain, 2022 (5 pages).

Specification filed in U.S. Application on Oct. 21, 2022, No. U.S. Appl. No. 18/048,769 (30 pages).

International Search Report and Written Opinion issued in International Application No. PCT/CN2022/127200, mailed Jul. 21, 2023 (8 pages).

* cited by examiner

METHODS AND SYSTEMS FOR DETERMINING ATTENUATED TRAVELTIME USING PARALLEL PROCESSING

BACKGROUND

Seismic surveys may be used to characterize a geological region of interest. Seismic surveys may do so by generating and recording seismic waves that travel into the geological region of interest. The seismic waves may reflect and refract at geological boundaries. The reflected and refracted seismic waves may be processed such that the location of geological boundaries may be realized within the geological region of interest. However, the seismic waves may be attenuated as they travel through the geological region of interest due to absorption, scattering, and geometrical spreading. Attenuation may result in a loss of seismic wave energy that may manifest as a loss of seismic wave amplitude and phase distortion.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method. The method includes obtaining seismic data based on a seismic survey of a geological region of interest, obtaining a velocity model, and obtaining an attenuation model. The seismic data includes an amplitude and a phase of seismic waves traveling from a seismic source location to each of a plurality of seismic receiver locations. The method further includes determining a traveltime model using the seismic source location, the velocity model, and a traveltime Eikonal function and determining an attenuated traveltime model using a parallel fast sweeping method. The parallel fast sweeping method includes Cuthill-McKee ordering a plurality of grid nodes into a plurality of levels for each of a plurality of sweeps. The plurality of grid nodes represents the geological region of interest. The parallel fast sweeping method further includes using the seismic source location, the velocity model, the attenuation model, the traveltime model, and an attenuated traveltime Eikonal function. The method further includes generating an updated attenuation model of the geological region of interest using the attenuated traveltime model, the amplitude, and the phase.

In general, in one aspect, embodiments relate to a system. The system includes a seismic acquisition system configured to acquire seismic data comprising an amplitude and a phase of seismic waves traveling from a seismic source location to each of a plurality of seismic receiver locations. The system further includes a seismic processing system comprising a computer processor. The seismic processing system is configured to receive the seismic data based on a seismic survey of a geological region of interest, receive a velocity model, and receive an attenuation model. The seismic processing system is further configured to determine a traveltime model using the seismic source location, the velocity model, and a traveltime Eikonal function and determine an attenuated traveltime model using a parallel fast sweeping method. The parallel fast sweeping method includes Cuthill-McKee ordering a plurality of grid nodes into a plurality of levels for each of a plurality of sweeps. The plurality of grid nodes represents the geological region of interest. The parallel fast sweeping method further includes using the seismic source location, the velocity model, the attenuation model, the traveltime model, and an attenuated traveltime Eikonal function. The seismic processing system is still further configured to generate an updated attenuation model of the geological region of interest using the attenuated traveltime model, the amplitude, and the phase.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
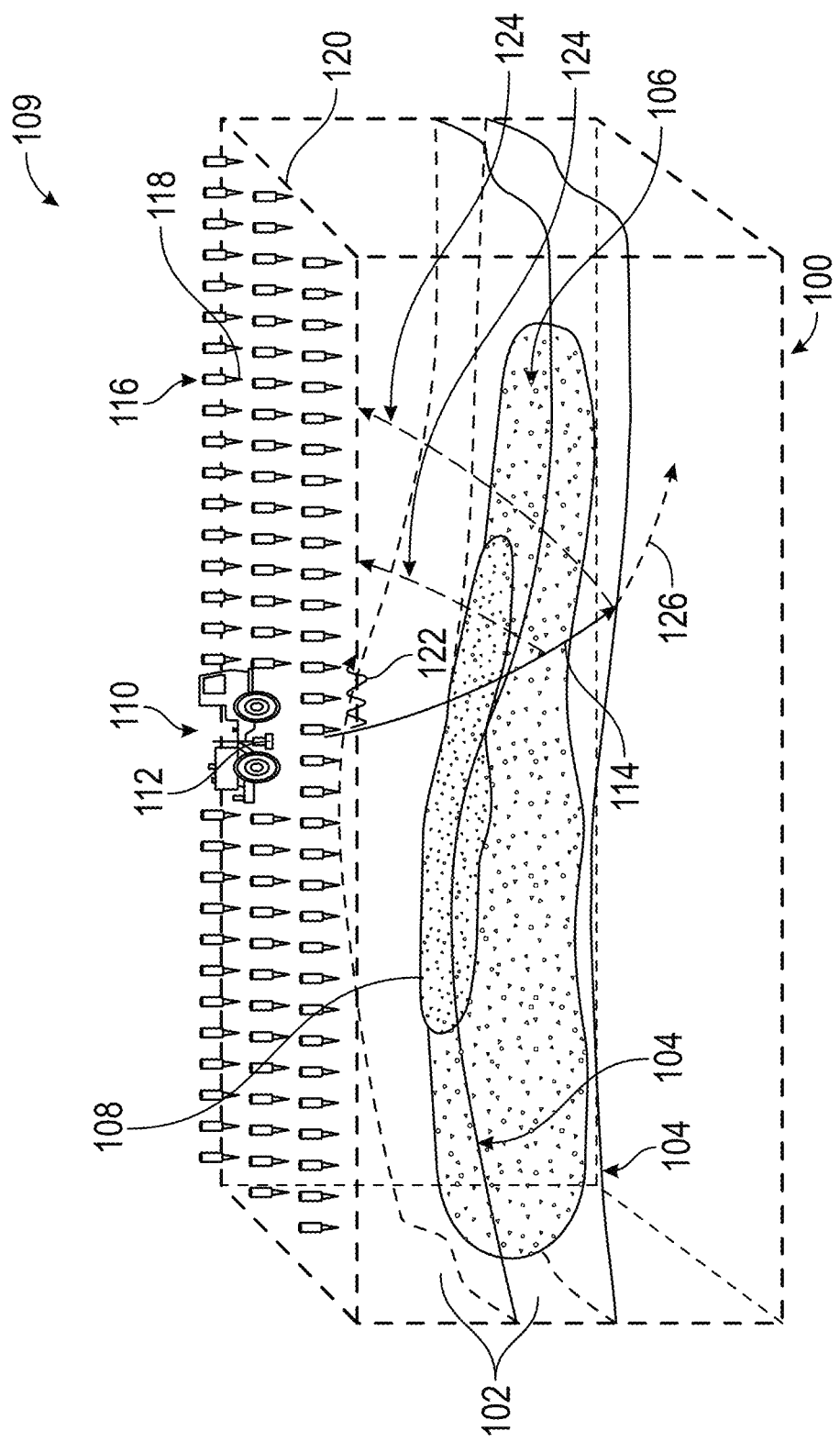
FIG. 1 illustrates a seismic survey in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a grid node" includes reference to one or more of such nodes.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-9, any component described regarding a figure, in various embodiments disclosed herein, may be equivalent to one or more like-named components described regarding any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described regarding a corresponding like-named component in any other figure.

Methods and systems are disclosed to determine an attenuated traveltime model. Systems include a seismic processing system that includes a graphics processing unit (GPU) with functionality to determine attenuated traveltimes in parallel. Methods include Eikonal functions, Cuthill-McKee ordering, and a parallel fast sweeping method.

Turning to FIG. 1, FIG. 1 depicts a geological region of interest (100) in accordance with one or more embodiments. The geological region of interest (100) consists of layers of rock (102) separated by geological discontinuities (104). Further, the geological region of interest (100) may contain a hydrocarbon reservoir (106), which may include a gas deposit (108).

A seismic survey (109) may be performed for the geological region of interest (100) using a seismic acquisition system. The seismic acquisition system includes a seismic source (110) located at a seismic source location (112). The seismic source (110) generates radiated seismic waves (114). In a land environment, the seismic source (110) may be a dynamite source or one or more seismic vibrators ("vibroseis truck"). In a marine or lacustrine environment, the seismic source (110) may be an air gun. The radiated seismic waves (114) from a single activation of the seismic source (110) may be recorded by tens of thousands to hundreds of thousands of seismic receivers (116) each located at a seismic receiver location (118). In a land environment, the seismic receivers (116) may record the velocity or acceleration of ground motion caused by the seismic source (110). In a marine or lacustrine environment, the seismic receivers (116) may record pressure fluctuations caused by the seismic source (110).

Some radiated seismic waves (114) may propagate into the air above the geological region of interest (100) and return to the surface (120) as air waves. Other radiated seismic waves (114) may propagate along the surface (120) as surface waves or direct waves (alternatively "ground-roll") (122). Still other radiated seismic waves (114) may propagate into the geological region of interest (100), reflect (and possibly refract) at one or more geological discontinuities (104), and return to the surface (120) as reflected seismic waves (124). Still other radiated seismic waves (114) may propagate into the geological region of interest (100), refract (and possibly reflect) at one or more geological discontinuities (104), and continue propagating into the geological region of interest (100) as refracted seismic waves (126). Hereinafter, radiated seismic waves (114), including direct waves (122), reflected seismic waves (124), and refracted seismic waves (126) are collectively referred to as simply "seismic waves."

Figure 2:
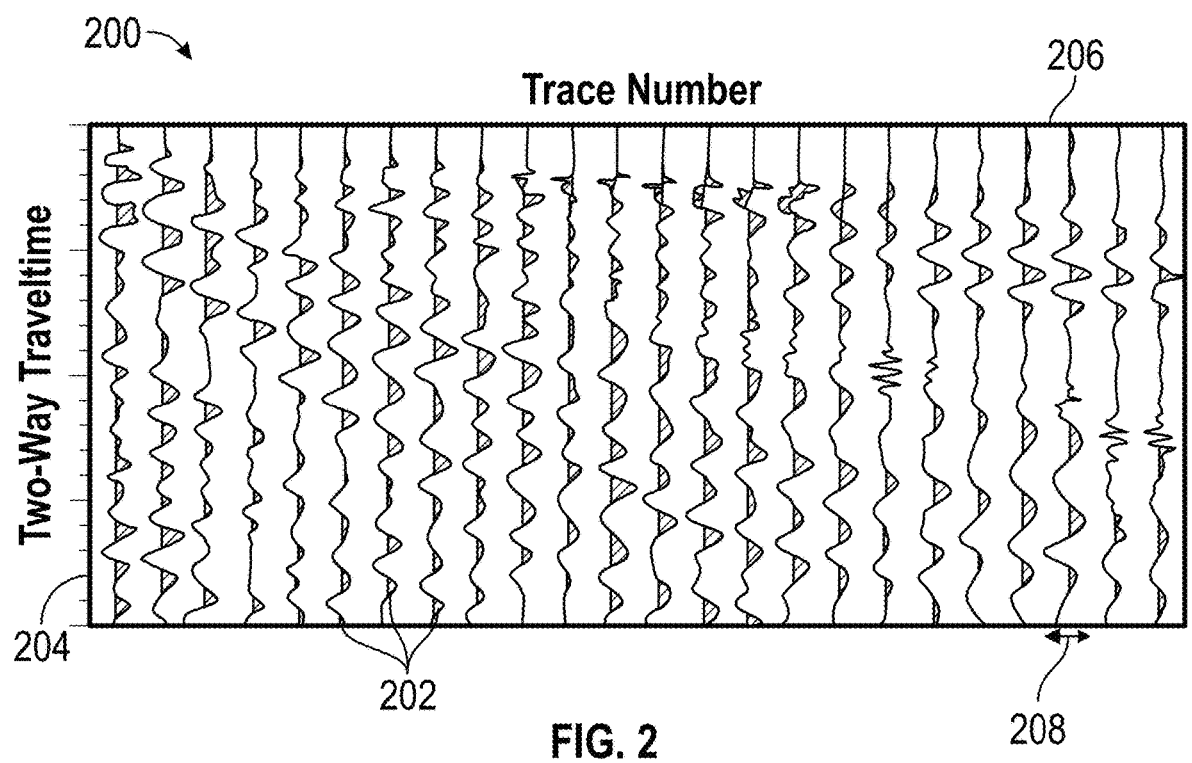
FIG. 2 shows seismic data in accordance with one or more embodiments.

Seismic waves may be ultimately recorded by seismic receivers (116) as a time series representing the amplitude of ground motion or pressure fluctuation at a sequence of discrete times. The time series may be denoted a "seismic trace." Seismic traces may make up seismic data. FIG. 2 displays an illustrative example of seismic data (200) in accordance with one or more embodiments. The seismic traces (202) may present relative to two-way traveltime located along the ordinate (204). Two-way traveltime may be defined as the time it takes for a seismic wave to travel two ways or down into the geological region of interest (100) and back up to the surface (120). Each seismic trace (202) (hereinafter also "trace") may be designated by a trace number located along the abscissa (206). In some embodiments, each trace (202) may be associated to a seismic receiver (116) that recorded seismic waves generated by a single activation of the seismic source (110). In other embodiments, each trace (202) may be associated to a seismic receiver (116) that recorded seismic waves generated by multiple activations of the seismic source (110) at a single seismic source location (112). Seismic data (200) may be processed. Manifestations of geological discontinuities (104) within the processed seismic data (200) may then be interpreted to realize geological discontinuities (104), including hydrocarbon reservoirs (106), within the geological region of interest (100).

As each seismic wave propagates through the geological region of interest (100) during a seismic survey (109), the seismic wave may attenuate or dissipate in energy. Attenuation may occur due to absorption, scattering, and geometrical spreading, among other reasons. Absorption (alternatively "anelastic attenuation") may occur due to internal friction, viscosity dissipation, and other anelastic processes. Absorption may result in a portion of the energy of a seismic wave converting to heat. Scattering (alternatively "elastic attenuation") may occur at rock heterogeneities, which include geological discontinuities (104) and hydrocarbon reservoirs (106), with the geological region of interest (100). Geometrical spreading may occur as a seismic wave broadens spherically as it propagates away from the seismic source location (112) through the geological region of interest (100). Attenuation may affect high-frequency seismic waves more than low-frequency seismic waves. Further, attenuation may increase with time and distance.

Attenuation may manifest within the seismic data (200) in the form of reduced amplitudes (208) and phase distortion of the seismic traces (202) relative to those seismic traces (202) that would be observed if attenuation were not present. As such, attenuation within the seismic data (200) may lead to an inaccurate interpretation of manifestations of geological discontinuities (104).

Thus, it may be useful to compensate seismic data (200) for attenuation. To do so, seismic data R (200) may be modeled in the frequency domain where:

$$R(f) = GH(f)S(f). \quad \text{Equation (1)}$$

In Equation (1), G is a frequency-independent factor that accounts for geometrical spreading, f is the frequency, H(f) is an attenuation effect, and S(f) is a wavelet produced by the seismic source (110). The attenuation effect H(f) is an accumulative effect and may be written as:

$$H(f) = \exp\left(-f \int_p \pi/(Qv)dp\right) = \exp\left(-\pi f \int_p dt^*\right). \quad \text{Equation (2)}$$

In Equation (2), p is the ray path along which a seismic wave propagates, v is the velocity of seismic wave propagation, Q is the attenuation factor associated with the seismic wave, and t* is attenuated traveltime of the seismic wave. The attenuation factor Q (alternatively "quality factor") is the ratio of peak energy relative to attenuated energy of a seismic wave. Typically, the attenuation factor Q for seismic wave propagation may range from approximately 10 to 1000. Attenuation may alternatively be quantified in the form of the inverse attenuation factor q where q=1/Q. The attenuated traveltime t* may be further defined by:

$$t^* = \int_p 1/(Qv)dp = \int_p (q/v)dp. \quad \text{Equation (3)}$$

As such, the attenuated traveltime t* is a function of both velocity v and attenuation factor Q along the ray path p. Based on Equation (3), velocity v and the attenuation factor Q or inverse attenuation factor q may be used, in part, to determine the attenuated traveltime t* of seismic waves.

The attenuated traveltime t* may be determined using Eikonal functions. For example, a traveltime Eikonal function may relate traveltime t to velocity v where:

$$|\nabla t(x)| = \frac{1}{v(x)}. \quad \text{Equation (4)}$$

Here, $\nabla$ is the gradient operator and x is a location within the geological region of interest (100). The traveltime t may be the time is takes for a seismic wave to travel from the seismic source location (112) to the location x assuming little-to-no attenuation. The velocity v may depend on the physical characteristics of the rock (102) the seismic wave is propagating through. For example, a seismic wave may travel between 0.2 and 1.0 kilometers/second in unconsolidated dry sand. However, a seismic wave may travel between 3.0 and 4.0 kilometers/second in limestone.

Further, an attenuated traveltime Eikonal function may relate attenuated traveltime t* to traveltime t, velocity v, and the inverse attenuation factor q where:

$$|\nabla t^*(x) \cdot \nabla t(x)| = \frac{q(x)}{v(x)}. \quad \text{Equation (5)}$$

The attenuated traveltime t* may describe the amplitude and phase distortion caused by attenuation at location x. The traveltime Eikonal function shown in Equation (4) and the attenuated traveltime Eikonal function shown in Equation (5) may be used to determine the traveltime t and attenuated traveltime t* at discrete locations x within the geological region of interest (100). Hereinafter, the traveltime Eikonal function and the attenuated traveltime Eikonal function may be collectively referred to as simply "Eikonal functions."

Figure 3A:
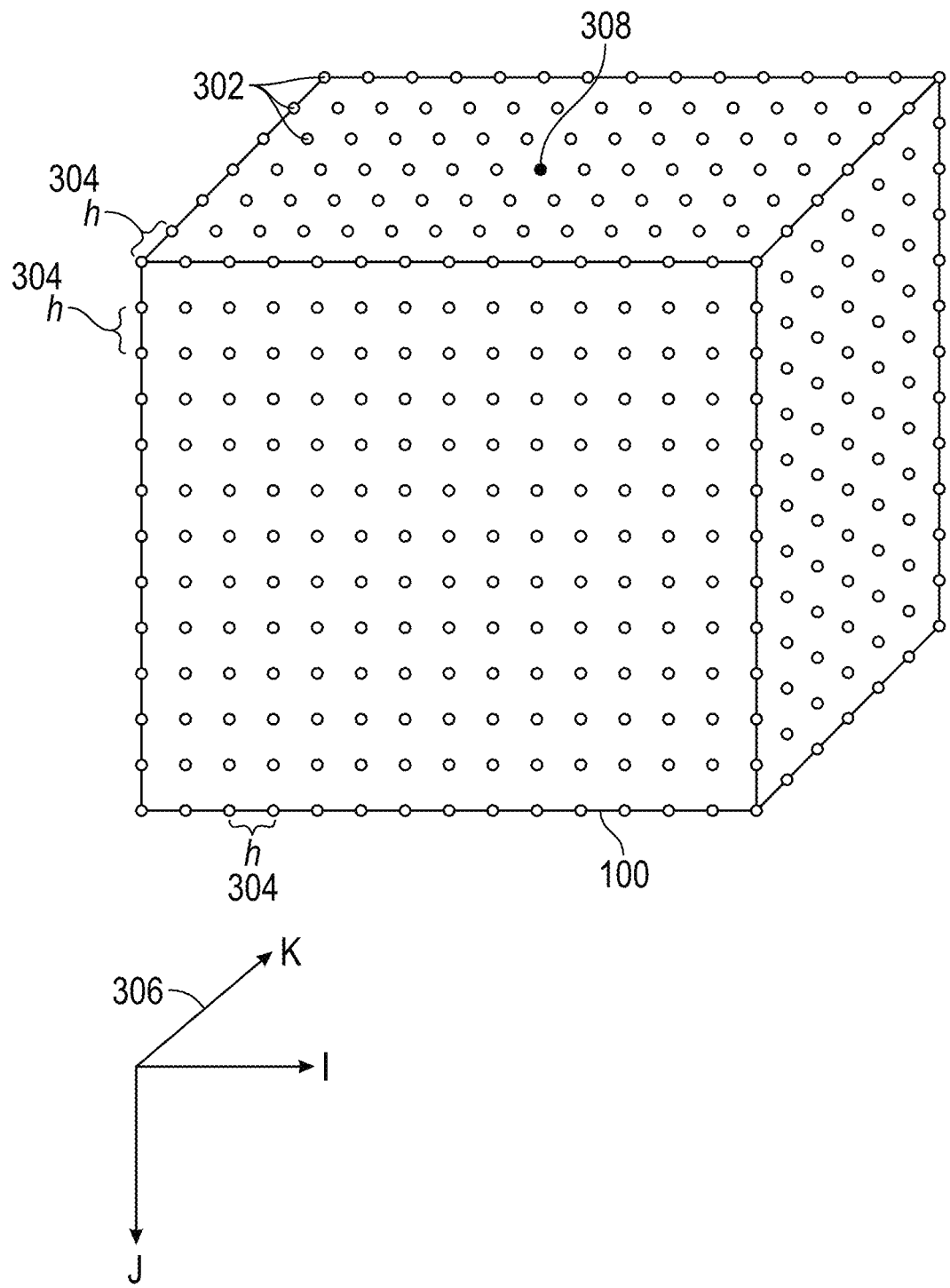
FIG. 3A shows grid nodes in accordance with one or more embodiments.

To determine the traveltime t and attenuated traveltime t* at discrete locations x within the geological region of interest (100), the geological region of interest (100) may first need to be modeled using grid nodes. FIG. 3A illustrates grid nodes (302) that represent the geological region of interest (100) in accordance with one or more embodiments. Specifically, the grid nodes (302) in FIG. 3A correspond to a three-dimensional grid. In other embodiments, the grid nodes (302) may correspond to a two-dimensional grid. Hereinafter, each grid node position x may be designated by index values based on the location of each grid node (302) relative to a coordinate system (306). For example, a three-dimensional grid of grid nodes (302) may index grid nodes (302) using the subscripts i, j, and k. In some embodiments, the grid nodes (302) may be equally spaced in each dimension by a distance h (304). In other embodiments, the grid nodes (302) may be separated by a different increment, $h_1$, $h_2$, $h_3$, (not shown) along each axis I, J, and K of the coordinate system (306). In still other embodiments, the increments may vary along one or more axes I, J, and K of the coordinate system (306).

In some embodiments, the seismic source location (112) may be represented by a first grid node (308). In some embodiments, each seismic receiver location (118) may also be represented by a grid node (302). Each grid node (302) may have one or more values associated to it. For example, a velocity $v_{i,j,k}$ and an attenuation factor $Q_{i,j,k}$ or inverse attenuation factor $q_{i,j,k}$ may be associated to each grid node (302). Hereinafter, the velocity $v_{i,j,k}$ at all grid nodes (302) is denoted a "velocity model." Hereinafter, in some embodiments, the inverse attenuation factor $q_{i,j,k}$ at all grid nodes (302) may be denoted an "attenuation model." In other embodiments, the attenuation factor $Q_{i,j,k}$ at all grid nodes (302) may be denoted the "attenuation model."

Figure 3C:
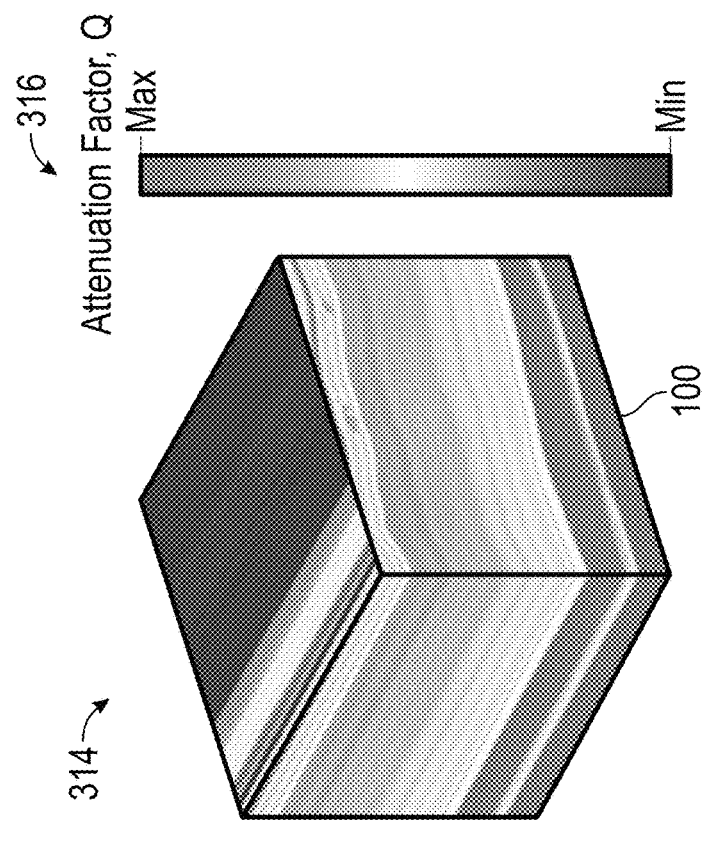
FIG. 3C shows an attenuation model in accordance with one or more embodiments.
Figure 3B:
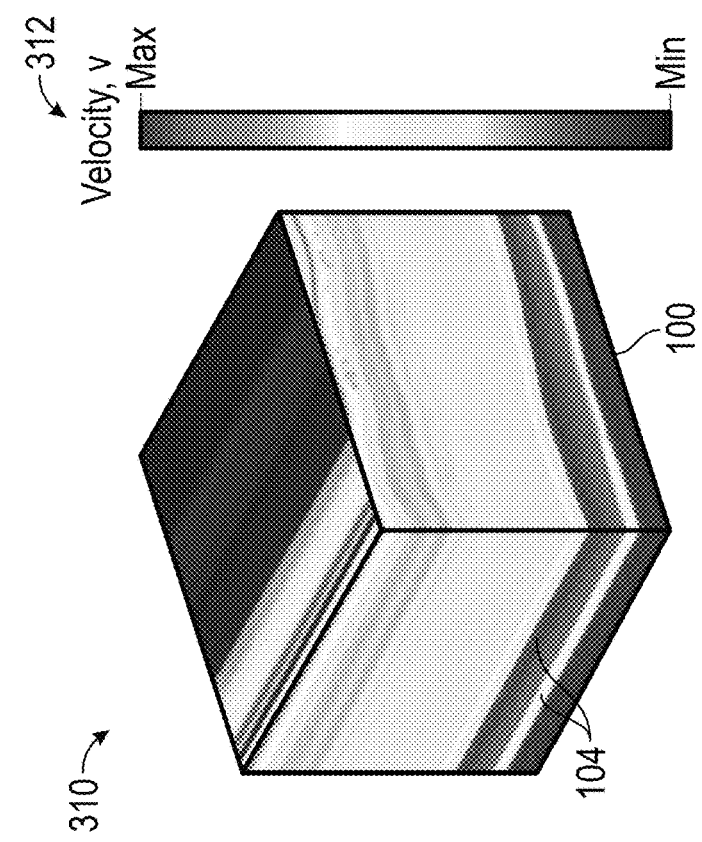
FIG. 3B shows a velocity model in accordance with one or more embodiments.

FIG. 3B shows a velocity model (310) in accordance with one or more embodiments. The velocity model (310) includes a velocity $v_{i,j,k}$ for each grid node (302) based on the first key (312). Geological discontinuities (104) may manifest within the velocity model (310) at positions where spatial changes in velocity are substantial and rapid.

FIG. 3C shows an attenuation model (314) in accordance with one or more embodiments. The attenuation model (314) includes an attenuation factor $Q_{i,j,k}$ for each grid node (302) based on the second key (316). Larger values of the attenuation factor $Q_{i,j,k}$ indicate greater attenuation. A person of ordinary skill in the art will appreciate that the inverse attenuation factor $q_{i,j,k}$ may be used in place of the attenuation factor $Q_{i,j,k}$.

It may be useful to order the grid nodes (302) in a specific manner to determine a traveltime model or attenuated traveltime model using one or more Eikonal functions.

One method of ordering the grid nodes (302) is to order them along the axes I, J, and K of the coordinate system (306) in series. For example, for a three-dimensional grid, the grid nodes (302) may be ordered by:

$$i = 1: I, j = 1: J, k = 1: K. \qquad \text{Equation (6)}$$

Further, the ordering may be done for alternating sweep directions (hereinafter also "sweeps"). Equation (6) may be considered the ordering of the grid nodes (302) for a first sweep. For a second sweep, the grid nodes (302) may be ordered by:

$$i = I: 1, j = 1: J, k = 1: K. \qquad \text{Equation (7)}$$

In some embodiments, $2^2$ unique sweeps may be performed across a two-dimensional grid. In some embodiments, $2^3$ unique sweeps may be performed across a three-dimensional grid.

Figure 4:
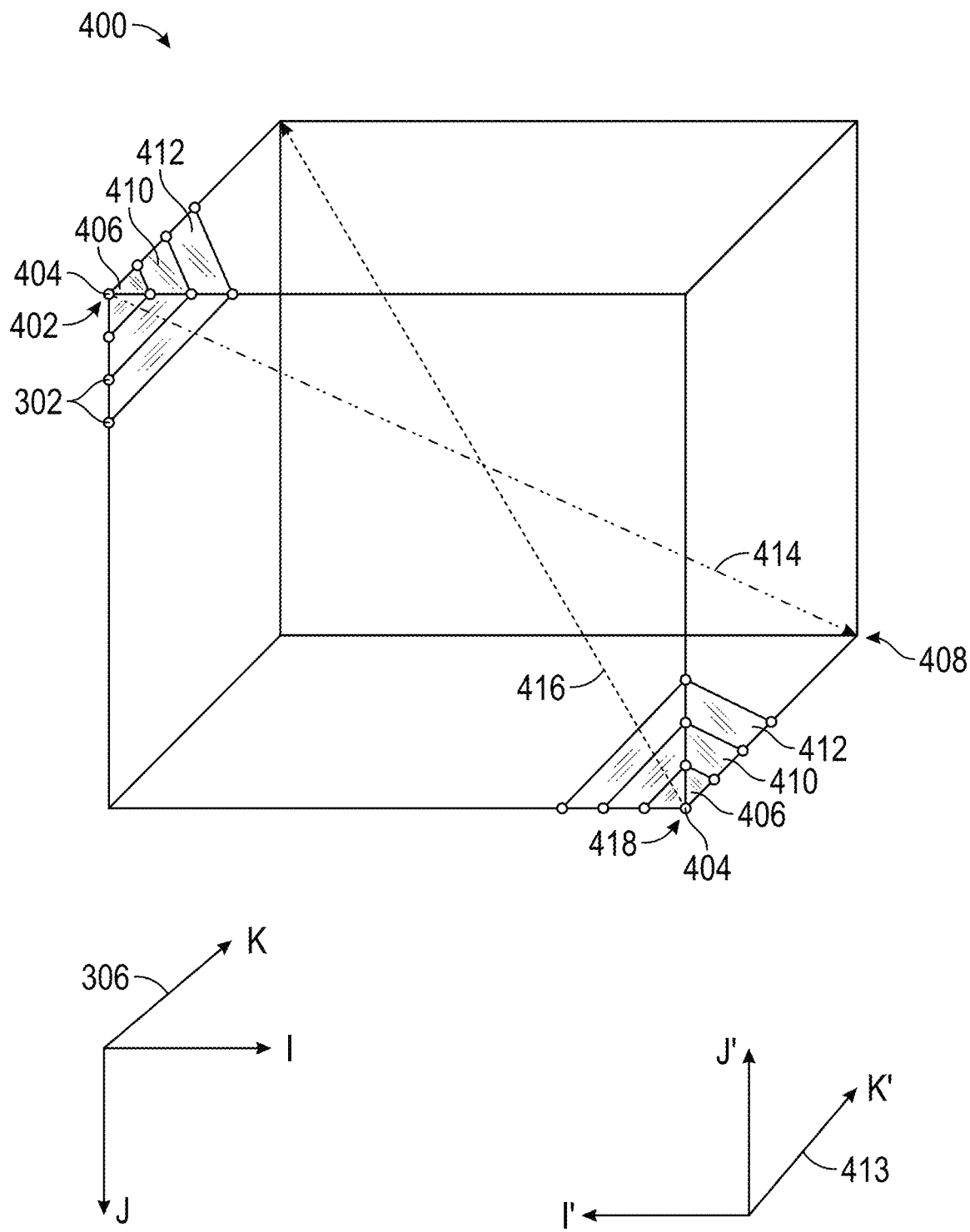
FIG. 4 shows Cuthill-McKee ordering in accordance with one or more embodiments.

Another method of ordering the grid nodes (302) is Cuthill-McKee ordering. FIG. 4 illustrates Cuthill-McKee ordering (400) in accordance with one or more embodiments. Hereinafter, the term to "Cuthill-McKee order" may also be used. Cuthill-McKee ordering (400) may assign the grid nodes (302) into levels l based on a summation of the indices i, j, and k of each grid node (302) relative to the coordinate system (306) where:

$$l = i + j + k. \qquad \text{Equation (8)}$$

Thus, ordering may begin at the corner (402) (i.e., the origin of the coordinate system (306)) where level 0 (404) includes grid node 0,0,0, level 1 (406) includes grid nodes 1,0,0; 0,1,0; and 0,0,1, etc., until the last level l reaches the opposing corner (408). Note that FIG. 4 only shows the perimeter grid nodes (302) for level 0 (404), level 1 (406), level 2 (410), and level 3 (412) for clarity.

Equation (8) and the coordinate system (306) may be used to Cuthill-McKee order (400) the grid nodes (302) for a first sweep (414). For a second sweep (416), a transformed coordinate system (413) may be used to reassign the indices of the grid nodes (302) using i', j', and k' so that Cuthill-McKee ordering (400) begins in another corner (418) (i.e., the transformed origin of the transformed coordinate system (413)). A modified Equation (8) and the transformed coordinate system (413) may then be used to Cuthill-McKee order (400) the grid nodes (302) for the second sweep (416) using the new indices i', j', and k'. This process of transforming the coordinate system (306) and reassigning indices may continue for numerous sweeps. Like the previous method of ordering, $2^3$ unique sweeps may be performed across a three-dimensional grid and $2^2$ unique sweeps may be performed across a two-dimensional grid.

Cuthill-McKee ordering (400) may allow for values associated to grid nodes (302) with each level l to be determined in parallel using a seismic processing system. The seismic processing system may be a computer system configured with specific hardware and/or software.

Figure 5:
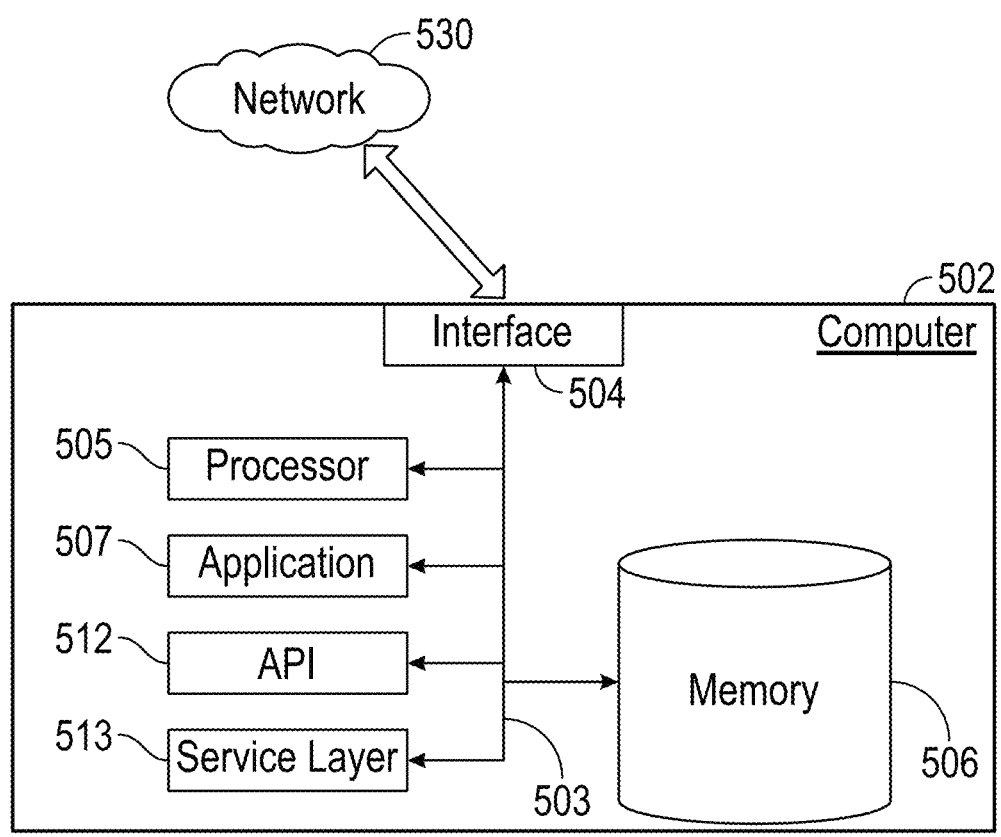
FIG. 5 shows a computer system in accordance with one or more embodiments.
Figure 6:
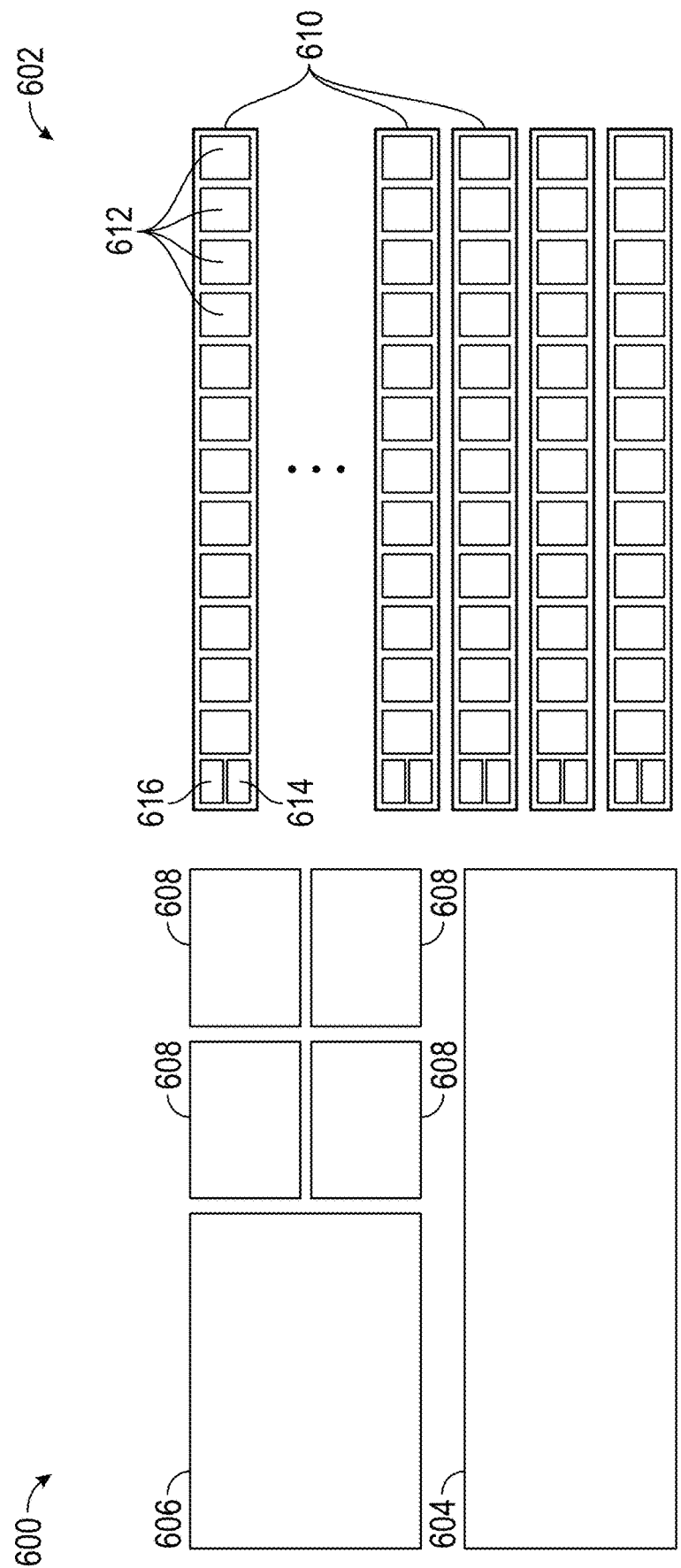
FIG. 6A shows a central processing unit in accordance with one or more embodiments.
FIG. 6B shows a graphics processing unit in accordance with one or more embodiments.

FIG. 5 illustrates a computer system (502) in accordance with one or more embodiments. While the computer system (502) may generically denote a seismic processing system, the computer system (502) may alternatively be configured as a seismic interpretation workstation. The seismic interpretation workstation may be used for seismic interpretation. For example, seismic interpretation may include identifying a hydrocarbon reservoir (106) within a geological region of interest (100) using a seismic image.

The computer system (502) is intended to depict any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer system (502) may include an input device, such as a keypad, keyboard, touch screen, or other device that can accept user information, and an output device that displays information, including digital data, visual or audio information (or a combination of both), or a graphical user interface. Specifically, a seismic interpretation workstation may include a robust graphics card for the detailed rendering of a seismic image that may be displayed and manipulated in a virtual reality system using 3D goggles, a mouse, or a wand.

The computer system (502) can serve in a role as a client, network component, server, database, or any other component (or a combination of roles) of a computer system (502) as required for seismic processing and seismic interpretation. Each illustrated computer system (502) is communicably coupled with a network (530). For example, a seismic processing system and a seismic interpretation workstation may be communicably coupled using a network (530). In some implementations, one or more components of the computer system (502) may be configured to operate within environments, including cloud-computing-based, local, global, or other environment (or a combination of environments).

At a high level, the computer system (502) is an electronic computing device operable to receive, transmit, process, store, and/or manage data and information associated with seismic processing or seismic interpretation. According to some implementations, the computer system (502) may also include or be communicably coupled with an application server, e-mail server, web server, caching server, streaming data server, business intelligence (BI) server, or other server (or a combination of servers).

Because seismic processing and seismic interpretation may not be sequential, a seismic interpretation workstation may receive requests over network (530) from a seismic processing system (or vice versa) or another client application and respond to the received requests by processing the requests appropriately. For example, a seismic image where the manifestation of a hydrocarbon reservoir (106) has been interpreted may be further processed to improve the focus of the manifestation of the hydrocarbon reservoir (106). In addition, requests may also be sent to the computer system (502) from internal users (for example, from a command console or by other appropriate access method), external or third-parties, other automated applications, as well as any other appropriate entities, individuals, systems, or computer systems (502).

Each of the components of the computer system (502) can communicate using a system bus (503). In some implementations, any or all of the components of the computer system (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer system (502) or other components (whether or not illustrated) that are communicably coupled to the computer system (502). The functionality of the computer system (502) may be accessible for all service consumers using this service layer (513). Software services, such as those provided by the service layer (513), provide reusable, defined business functionalities through a defined interface. For example, the interface may be software written in JAVA, C++, or other suitable language providing data in extensible markup language (XML) format or another suitable format. While illustrated as an integrated component of the computer system (502), alternative implementations may illustrate the API (512) or the service layer (513) as stand-alone components in relation to other components of the computer system (502) or other components (whether or not illustrated) that are communicably coupled to the computer system (502). Moreover, any or all parts of the API (512) or the service layer (513) may be implemented as child or sub-modules of another software module, enterprise application, or hardware module without departing from the scope of this disclosure.

The computer system (502) includes an interface (504). Although illustrated as a single interface (504) in FIG. 5, two or more interfaces (504) may be used according to particular needs, desires, or particular implementations of the computer system (502). The interface (504) is used by the computer system (502) for communicating with other systems in a distributed environment that are connected to the network (530). Generally, the interface (504) includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the computer system (502).

The computer system (502) includes at least one computer processor (505). Generally, a computer processor (505) executes any instructions, algorithms, methods, functions, processes, flows, and procedures as described in the instant disclosure. The computer processor (505) may be a central processing unit (CPU) and/or a graphics processing unit (GPU). In some embodiments, the seismic processing system includes a CPU communicably coupled to one or more GPUs. CPUs and GPUs will be further discussed in reference to FIG. 6.

Returning to FIG. 5, the computer system (502) also includes a memory (506) that holds data for the computer system (502) or other components (or a combination of both) that can be connected to the network (530). For example, memory (506) can be a database storing data consistent with this disclosure. The memory (506) may be separated into short-term memory known as random access memory (RAM) and long-term memory known as a hard drive. The hard drive of the memory (506) permanently stores information. For example, the seismic data (200), the grid nodes (302), and the Eikonal functions may be stored on the hard drive of the memory (506). The RAM of the memory (506) temporarily stores information. The RAM may temporarily store seismic data (200) from the hard drive. Although illustrated as a single memory (506) in FIG. 5, two or more memories (506) may be used according to particular needs, desires, or particular implementations of each computer system (502) and the described functionality. While memory (506) is illustrated as an integral component of each computer system (502), in alternative implementations, memory (506) can be external to each computer system (502). For example, tape readers or high-capacity hard drives (both types of memory (506)) may be connected to the seismic processing system using wide-band system buses (503).

The application (507) is an algorithmic software engine providing functionality according to particular needs, desires, or particular implementations of the computer system (502), particularly with respect to functionality described in this disclosure. For example, application (507) can serve as one or more components, modules, applications, etc. Further, although illustrated as a single application (507), the application (507) may be implemented as multiple applications (507) on the computer system (502). In addition, although illustrated as integral to the computer system (502), in alternative implementations, the application (507) can be external to the computer system (502).

There may be any number of computer systems (502) associated with, or external to, a seismic processing system and a seismic interpretation workstation, wherein each computer system (502) communicates over network (530). Further, the term "client," "user," and other appropriate terminology may be used interchangeably as appropriate without departing from the scope of this disclosure. Moreover, this disclosure contemplates that many users may use the computer system (502), or that one user may use multiple computer systems (502).

Turning to FIGS. 6A and 6B, FIG. 6A illustrates a simplified CPU (600) and FIG. 6B illustrates a simplified GPU (602) in accordance with one or more embodiments. In the context of this disclosure, a seismic processing system may be configured to include a CPU (600) communicably coupled to one or more GPUs (602). In a seismic processing system, the CPU (600) may act as a host while one or more GPUs (602) act as a server that serves or completes tasks as requested by the CPU (600) over the network (530). A CPU (600) may include a CPU cache (604), a CPU control (606), and one or more CPU cores (608). CPU cache (604) is a type of internal shared memory (506) that stores data. The CPU control (606) controls movement of data within the CPU (600) and controls CPU core (608) operations. The CPU cores (608) (alternatively "arithmetic and logic units" (ALU)) execute arithmetic operations, logic operations, and operations as computer instructions dictate. Typically, a CPU (600) may contain between one and eight CPU cores (608). FIG. 6A shows four CPU cores (608) for illustration purposes only. The architecture of a CPU (600) may be well suited for executing complex instructions in series. This process may be known as "serial computing" or "serial processing."

A GPU (602) may include multiprocessors (610) (alternatively "processing units"), warp schedulers, dispatch units, and registers among other components (not shown). Each multiprocessor (610) includes a GPU cache (614), a GPU control (616), and GPU cores (612) among other components. Unlike a CPU (600), a GPU (602) may contain hundreds to thousands of GPU cores (612) among the multiprocessors (610). For example, a GPU (602) may contain 16 multiprocessors (610) each of which contain 32 GPU cores (612). The GPU cores (612) within a multiprocessor (610) may be associated to one GPU control (616) and one GPU cache (614). Each GPU cache (614) may store less data than a CPU cache (604). Further, each GPU control (616) may be simpler than a CPU control (606). The architecture of a GPU (602) may be well suited for executing simple instructions in parallel. This process may be known as "parallel processing" or "parallel computing."

To execute instructions in parallel using a GPU (602), processing of the data may be arranged in grids which may be subdivided into blocks and further subdivided into threads. Note that a "warp" may contain a group of threads, typically 32 threads. Each thread may perform the instructions on a subset of the data using a GPU core (612). After each thread executes the instructions on a subset of the data, the threads may be combined back into blocks and then into grids to provide a complete result. In the context of this disclosure, each thread may determine updated attenuated traveltimes $t_{i,j,k}^*$ for grid nodes (302) with a level 1 in parallel. Using a GPU (602) to execute instructions in parallel may improve computing performance by reducing computation time relative to if instructions were executed in series.

Figure 7:
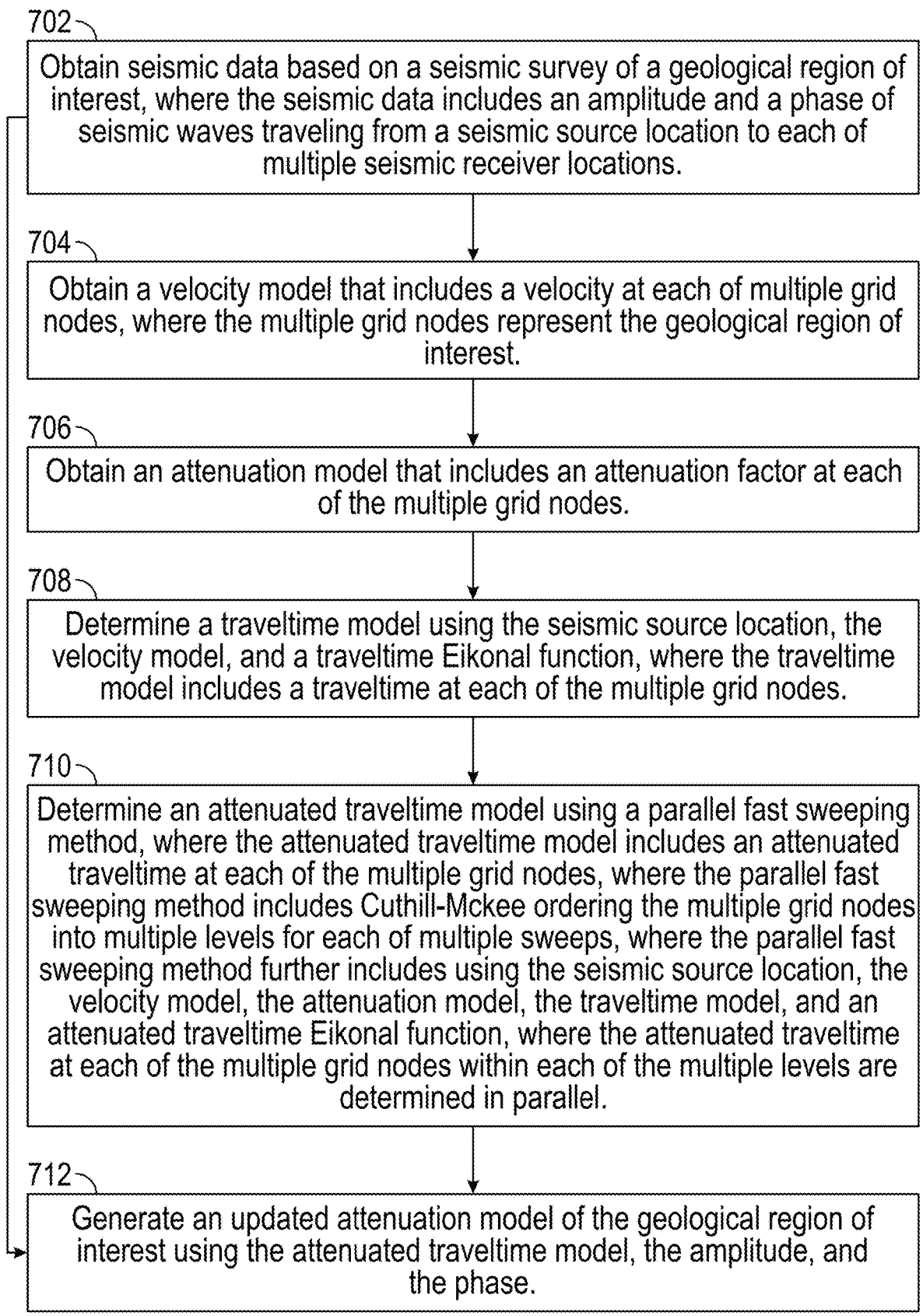
FIG. 7 illustrates a flowchart in accordance with one or more embodiments.

FIG. 7 shows a flowchart in accordance with one or more embodiments. The method outlined in the flowchart may be used to determine an attenuated traveltime model using parallel processing.

In step 702, seismic data (200) is obtained. The seismic data (200) includes the amplitudes (208) and the phases of the seismic waves generated and recorded during a seismic survey (109) of a geological region of interest (100) as described in FIG. 1. The seismic waves may be recorded as seismic traces (202) that propagate from a seismic source location (112) to each of multiple seismic receiver locations (118).

In step 704, a velocity model (310) is obtained. The velocity model includes a velocity $v_{i,j,k}$ at each grid node (302) where the grid nodes (302) represent the geological region of interest (100) as shown in FIG. 3A. The subscripts i, j, and k are indices that represent a location within the geological region of interest (100) based on a coordinate system (306). In some embodiments, a first grid node (308) among the grid nodes (302) may represent the position of the seismic source location (112) from the seismic survey (109). In some embodiments, other grid nodes (302) may represent the position of each of multiple seismic receiver locations (118).

The velocity model (310) may be displayed similar to the velocity model (310) shown in FIG. 3B. In some embodiments, the velocity model (310) may include little-to-no attenuation effects. In some embodiments, the velocity model (310) may be determined from a vertical seismic profile (VSP) survey.

In step 706, an attenuation model (314) is obtained. The attenuation model may include an attenuation factor $Q_{i,j,k}$ or an inverse attenuation factor $q_{i,j,k}$ at each grid node (302). The attenuation model (314) may be displayed similar to the attenuation model (314) shown in FIG. 3C. In some embodiments, the attenuation model (314) may be assumed or approximated.

In step 708, a traveltime model is determined. The traveltime model includes a traveltime $t_{i,j,k}$ at each grid node (302). Each traveltime $t_{i,j,k}$ is the time that it takes for a seismic wave to propagate from the first grid node (308) to the grid node (302) for which the traveltime $t_{i,j,k}$ is associated to assuming little-to-no attenuation.

In some embodiments, the first grid node (308) that represents the seismic source location (112) may be set to a fixed traveltime $t_{i,j,k}$ of zero. In some embodiments, the remaining grid nodes (302) may be initialized to traveltimes $t_{i,j,k}$ greater than zero. In other embodiments, the grid nodes (302) that represent each of multiple seismic receiver locations (118) may be set to fixed estimated or interpolated values of the traveltime $t_{i,j,k}$ and the remaining grid nodes (302) may be initialized to traveltimes $t_{i,j,k}$ greater than zero. In some embodiments, an upwind difference scheme may update initialized traveltimes $t_{i,j,k}$. For example, a Godunov upwind difference scheme may update the initialized traveltimes $t_{i,j,k}$ by reformulating Equation (4) as:

Equation (9)
$$[(t_{i,j,k}^h - t_{x\,min}^h)^+]^2 + [(t_{i,j,k}^h - t_{y\,min}^h)^+]^2 + [(t_{i,j,k}^h - t_{z\,min}^h)^+]^2 = \frac{h^2}{v_{i,j,k}^2},$$

where i=2, ..., 1-1, j=2, ..., J-1, and k=2, ..., K-1, $$t_{x\,min}^h = \min(t_{i-1,j,k}^h, t_{i+1,j,k}^h),$$
$$t_{y\,min}^h = \min(t_{i,j-1,k}^h, t_{i,j+1,k}^h),$$
$$t_{z\,min}^h = \min(t_{i,j,k-1}^h, t_{i,j,k+1}^h),$$

and $$(x)^+ = \begin{cases} x, & x > 0 \\ 0 & x \le 0 \end{cases}.$$

For initialized traveltimes $t_{i,j,k}$ at boundary or perimeter grid nodes (302), a one-sided difference scheme may be used, for example:

Equation (10)
$$[(t_{1,j,k}^h - t_{2,j,k}^h)^+]^2 + [(t_{1,j,k}^h - t_{y\,min}^h)^+]^2 + [(t_{1,j,k}^h - t_{z\,min}^h)^+]^2 = \frac{h^2}{v_{1,j,k}^2}.$$

In some embodiments, Equations (9) and (10) may be determined using Gauss-Seidel iterations. For each Gauss-Seidel iteration, the minimum traveltime $t_{i,j,k}$ is selected between the traveltime $t_{i,j,k}$ determined from the previous iteration and the traveltime $t_{i,j,k}$ determined using Equations (9) or (10) for the current iteration. Further, in some embodiments, Gauss-Seidel iterations may be performed for alternating sweeps using the grid node ordering described in Equations (6) and (7). This process is repeated until a convergence criterion is met. The process described in step 708 may be referred to as a "fast sweeping method." A person of ordinary skill in the art will appreciate that other schemes may be used in place of the fast sweeping method. Other schemes may include, but are not limited to, a fast marching method, a fast iterative method, and a parallel fast sweeping method. The parallel fast sweeping method will be described in step 710.

In step 710, an attenuated traveltime model is determined. The attenuated traveltime model includes an attenuated traveltime $t_{i,j,k}^*$ at each grid node (302). Each attenuated traveltime $t_{i,j,k}^*$ describes the amplitude and phase distortion caused by attenuation at each grid node (302).

First, a fixed value of zero for the attenuated traveltime $t_{i,j,k}^*$ is associated to the first grid node (308) that represents the seismic source location (112). Next, in some embodiments, fixed estimated or interpolated values for the attenuated traveltime $t_{i,j,k}^*$ are associated to the grid nodes (302) that represent each of multiple seismic receiver locations (118). Positive values for the attenuated traveltime $t_{i,j,k}*$ are initially associated to all remaining grid nodes (302). In other embodiments, positive values for the attenuated traveltime $t_{i,j,k}*$ are initially associated to all grid nodes (302) except the first grid node (308).

Following initialization of the attenuated traveltime model, a parallel fast sweeping method is performed. The parallel fast sweeping method may be an iterative process. The iterative process stops when a convergence criterion is satisfied. In some embodiments, the convergence criterion may be when the attenuated traveltimes $t_{i,j,k}^{*(n)}$ from the current iteration n equals the attenuated traveltimes $t_{i,j,k}^{*(n-1)}$ from the previous iteration n−1 for each grid node (302).

For each of multiple sweeps within the parallel fast sweeping method, Cuthill-McKee ordering (400) of the grid nodes (302) is used. For a two-dimensional grid, $2^2$ unique sweeps may be performed. For a three-dimensional grid, $2^3$ unique sweeps may be performed. Cuthill-McKee ordering (400) may order the grid nodes (302) by levels based on the summation of indices i,j, and k of the grid nodes (302) based on the coordinate system (306) as Equation (8) shows. For other sweeps, the indices i,j, and k of the grid nodes (302) may be reassigned based on a transformed coordinate system (413) as described in FIG. 4.

The attenuated traveltimes $t_{i,j,k}*$ for the grid nodes (302) within each level for each sweep for each iteration n may be updated in parallel. In some embodiments, the attenuated traveltime Eikonal function in Equation (5) may be reformulated as:

$$a\frac{\partial t^*}{\partial x} + b\frac{\partial t^*}{\partial y} + c\frac{\partial t^*}{\partial z} = \frac{q}{v^2}, \quad \text{Equation (11)}$$

where $$a = \frac{\partial t}{\partial x},$$

$$b = \frac{\partial t}{\partial y},$$

$$c = \frac{\partial t}{\partial z},$$

and x, y, and z are distances along the I, J, and K axes of the coordinate system (306). A finite difference scheme, which may be a part of the fast sweeping method, may then be used to determine intermediate attenuated traveltimes $t_{i,j,k}^{*(n)}$ where:

$$\left(\frac{a^-_{i-\frac{1}{2},j,k} - a^+_{i+\frac{1}{2},j,k}}{\Delta x} + \frac{b^-_{i,j-\frac{1}{2},k} - b^+_{i,j+\frac{1}{2},k}}{\Delta y} + \frac{b^-_{i,j,k-\frac{1}{2}} - b^+_{i,j,k+\frac{1}{2}}}{\Delta z}\right) t_{i,j,k}^{*(n)} =$$

$$\frac{a^-_{i-\frac{1}{2},j,k} t^{*(n)}_{i-1,j,k} - a^+_{i+\frac{1}{2},j,k} t^{*(n)}_{i+1,j,k}}{\Delta x} + \frac{a^-_{i,j-\frac{1}{2},k} t^{*(n)}_{i,j-1,k} - a^+_{i,j+\frac{1}{2},k} t^{*(n)}_{i,j+1,k}}{\Delta y} +$$

$$\frac{b^-_{i,j,k-\frac{1}{2}} t^{*(n)}_{i,j,k-1} - b^+_{i,j,k+\frac{1}{2}} t^{*(n)}_{i,j,k+1}}{\Delta z} + \frac{q_{i,j,k}}{v^2_{i,j,k}}. \quad \text{Equation (12)}$$

where, for example, $$(a)^- = \begin{cases} 0, & a \geq 0 \\ a & a < 0 \end{cases}.$$

Note that Equation (12) is used for a three-dimensional grid.

The minimum of the intermediate attenuated traveltimes $t_{i,j,k}^{*(n)}$ determined using Equation (12) and the attenuated traveltimes $t_{i,j,k}^{*(n-1)}$ from the previous iteration is selected as the updated attenuated traveltimes $t_{i,j,k}^{*(n)}$ One iteration n completes when the grid nodes (302) for all levels for all sweeps have been updated. If the attenuated traveltimes $t_{i,j,k}^{*(n)}$ from the current iteration n equals the attenuated traveltimes $t_{i,j,k}^{*(n-1)}$ from the previous iteration n−1 for each grid node (302), the parallel fast sweeping method may end and the attenuated traveltime model has been determined.

In some embodiments, the following script may be used to determine a two-dimensional attenuated traveltime model.

```
1   Initialize t_{i,j}^{*(0)}
2   n = 1
3   t̃*_{i,j} = t_{i,j}^{*(n-1)}
4     For ordering = 1:2^2,
5       Rotate_axes (ordering)
6       For level 2: I + J,
7         I_1 = max (1, level − J), I_2 = min (I, level − 1)
8         Parallel for i = I_1:I_2,
9           j = level − i
10          ((a^-_{i-1/2,j} − a^+_{i+1/2,j})/Δx + (b^-_{i,j-1/2} − b^+_{i,j+1/2})/Δz) t_{i,j}^{*(n)} =
              (a^-_{i-1/2,j} t^{*(n)}_{i-1,j} − a^+_{i+1/2,j} t^{*(n)}_{i+1,j})/Δx + (b^-_{i,j-1/2} t^{*(n)}_{i,j-1} − b^+_{i,j+1/2} t^{*(n)}_{i,j+1})/Δz + q_{i,j}/v^2_{i,j}
11    t̃*_{i,j} = min(t̃*_{i,j}, t_{i,j}^{*(n)})
12    t_{i,j}^{*(n)} = t̃*_{i,j}
13    if t_{i,j}^{*(n)} = t_{i,j}^{*(n-1)}, stop loop; otherwise n = n + 1 and go to line 3
```

In step 712, an updated attenuation model may be generated for the geological region of interest (100). The updated attenuation model may be generated using the amplitudes (208) and the phases from the seismic data (200) obtained in step 702 and the attenuated traveltime model determined in step 710.

Figure 8:
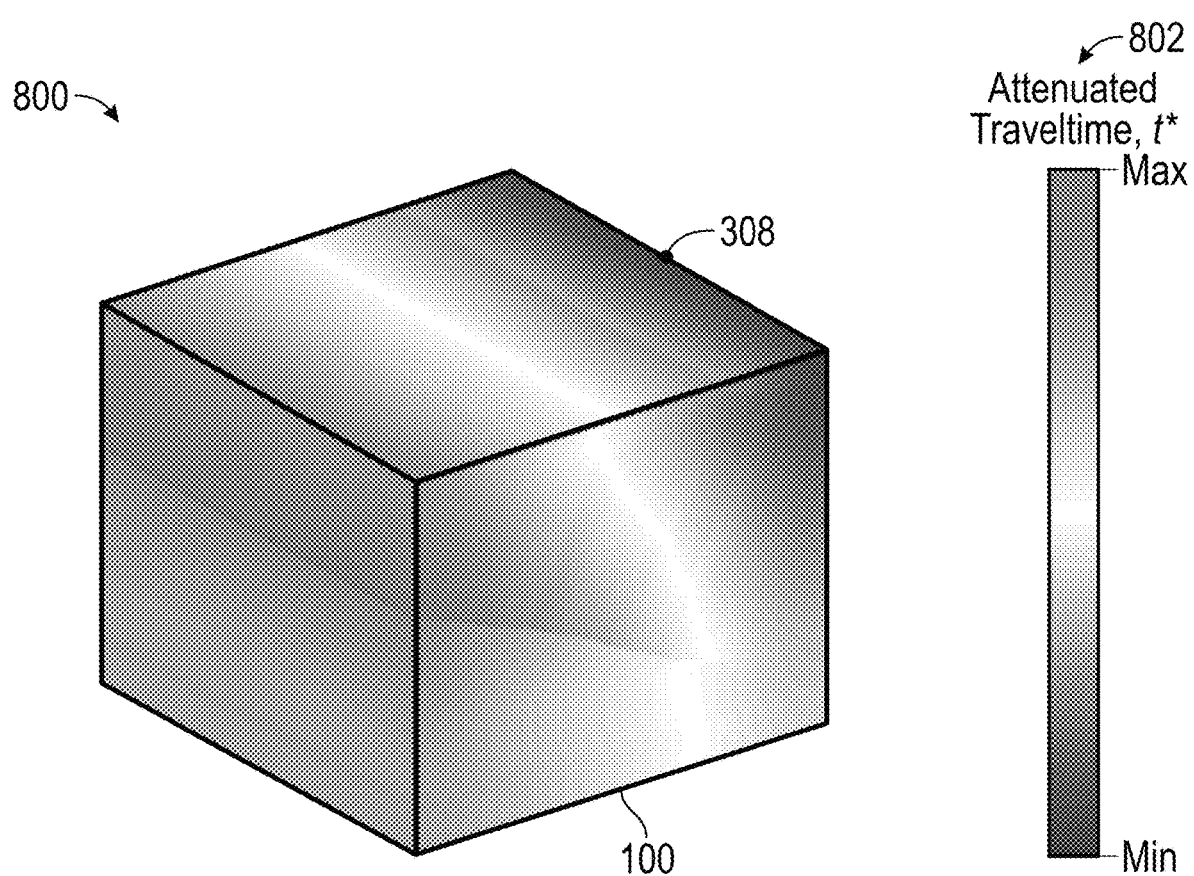
FIG. 8 shows an attenuated traveltime model in accordance with one or more embodiments.

FIG. 8 shows an attenuated traveltime model (800) in accordance with one or more embodiments. The attenuated traveltime model (800) is determined following steps 702 through 710 as described in FIG. 7. For reference, only the first grid node (308) that represents the seismic source location (112) is shown. The attenuated traveltime model (800) may present a range of attenuated traveltimes t* throughout the geological region of interest (100) as shown by the third key (802).

Figure 9:
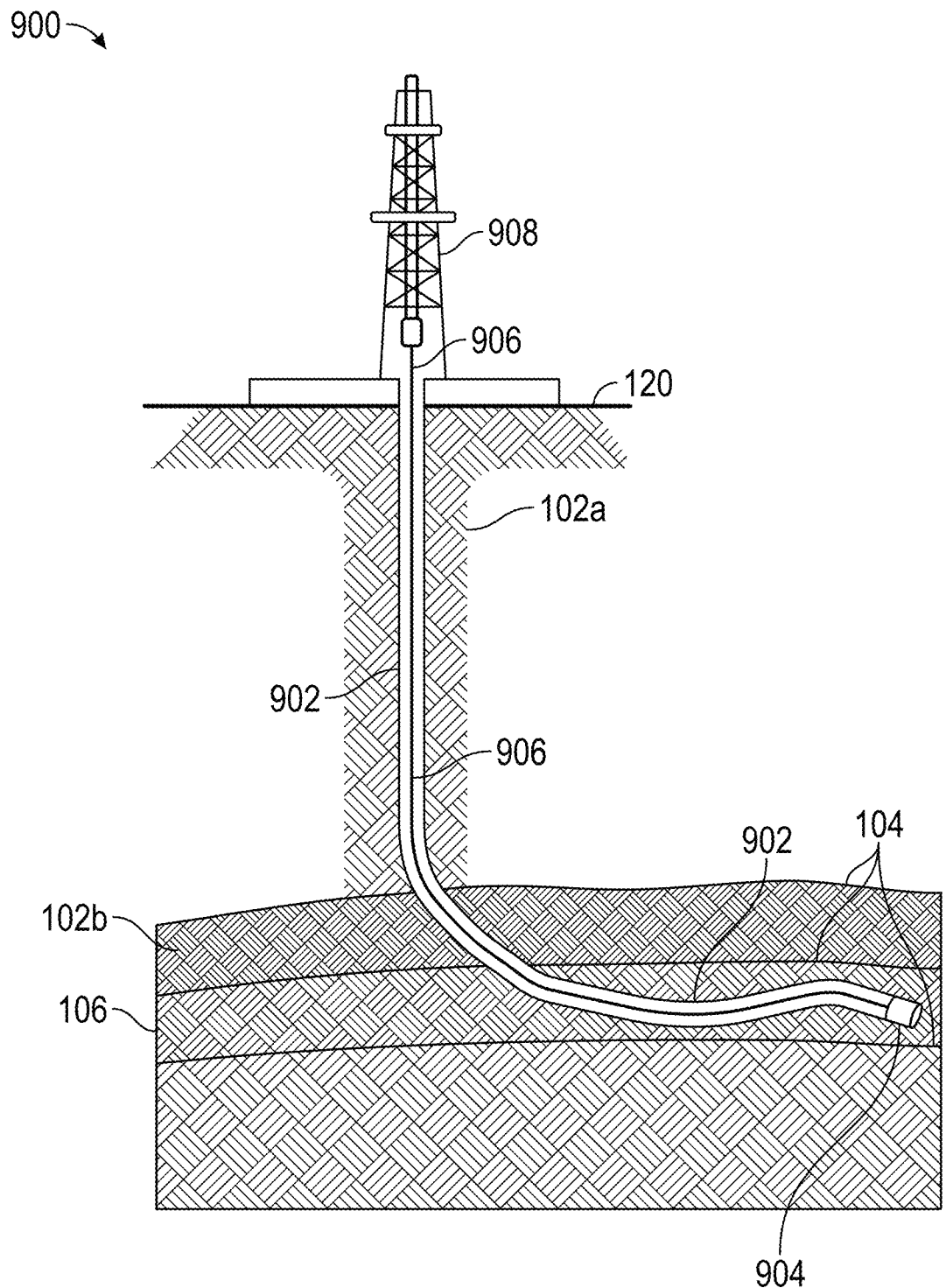
FIG. 9 shows a drilling system in accordance with one or more embodiments.

Following the flowchart described in FIG. 7, a seismic image may be determined using the seismic data (200) and the updated attenuation model. The seismic image may be interpreted to identify the manifestation of a hydrocarbon reservoir (106). A drilling system (900) as shown in FIG. 9 may then be used to drill a well (902) to penetrate the hydrocarbon reservoir (106) within the geological region of interest (100). A well (902) may be drilled using a drill bit (904) attached to a drillstring (906) further attached to a drill rig (908), where the drill rig (908) is located on the surface (120). The well (902) may traverse a plurality of overburden rock (102a), one or more cap rock layers (102b), and geological discontinuities (104) to reach a hydrocarbon reservoir (106).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method comprising:
    obtaining seismic data based on a seismic survey of a geological region of interest, wherein the seismic data comprises an amplitude and a phase of seismic waves traveling from a seismic source location to each of a plurality of seismic receiver locations;
    obtaining a velocity model comprising a velocity at each of a plurality of grid nodes, wherein the plurality of grid nodes represents the geological region of interest;
    obtaining an attenuation model comprising an attenuation factor at each of the plurality of grid nodes;
    determining, by a computer processor, a traveltime model using the seismic source location, the velocity model, and a traveltime Eikonal function, wherein the traveltime model comprises a traveltime at each of the plurality of grid nodes;
    determining, by the computer processor, an attenuated traveltime model using a parallel fast sweeping method,
        wherein the attenuated traveltime model comprises an attenuated traveltime at each of the plurality of grid nodes,
        wherein the parallel fast sweeping method comprises Cuthill-McKee ordering the plurality of grid nodes into a plurality of levels for each of a plurality of sweeps,
        wherein the parallel fast sweeping method further comprises using the seismic source location, the velocity model, the attenuation model, the traveltime model, and an attenuated traveltime Eikonal function, and
        wherein the attenuated traveltime at each of the plurality of grid nodes within each of the plurality of levels are determined in parallel; and
    generating, by the computer processor, an updated attenuation model of the geological region of interest using the attenuated traveltime model, the amplitude, and the phase.

2. The method of claim 1, further comprising determining a seismic image using the seismic data and the updated attenuation model.

3. The method of claim 2, further comprising:
    identifying, using a seismic interpretation workstation, a hydrocarbon reservoir within the geological region of interest using the seismic image.

4. The method of claim 3, further comprising:
    drilling a well to penetrate the hydrocarbon reservoir.

5. The method of claim 1, wherein determining the traveltime model further comprises:
    defining the traveltime for a first grid node among the plurality of grid nodes as zero, wherein the first grid node represents the seismic source location;
    initializing the traveltime for each of the plurality of grid nodes except the first grid node as a positive value; and
    determining an updated traveltime for each of the plurality of grid nodes except the first grid node using a fast sweeping method until a convergence criterion is satisfied.

6. The method of claim 1, wherein determining the attenuated traveltime model further comprises:
    defining the attenuated traveltime for a first grid node among the plurality of grid nodes as zero, wherein the first grid node represents the seismic source location;
    initializing the attenuated traveltime for each of the plurality of grid nodes except the first grid node as a positive value; and
    determining an updated attenuated traveltime for each of the plurality of grid nodes except the first grid node using the parallel fast sweeping method until a convergence criterion is satisfied.

7. The method of claim 6, wherein the convergence criterion comprises the updated attenuated traveltime equaling a previous attenuated traveltime.

8. The method of claim 1, wherein the plurality of grid nodes corresponds to a three-dimensional grid.

9. The method of claim 1, wherein the attenuation factor comprises an inverse attenuation factor.

10. The method of claim 1, wherein the computer processor comprises a graphics processing unit (GPU), wherein the attenuated traveltime at each of the plurality of grid nodes within each of the plurality of levels are determined in parallel using the GPU.

11. The method of claim 1, wherein Cuthill-McKee ordering comprises assigning each of the plurality of grid nodes to each of the plurality of levels based on an index of each of the plurality of grid nodes in a coordinate system.

12. The method of claim 1, wherein each of the plurality of sweeps reassigns each of the plurality of grid nodes to each of the plurality of levels based on a new index of each of the plurality of grid nodes in a transformed coordinate system.

13. A system comprising:
    a seismic acquisition system configured to acquire seismic data comprising an amplitude and a phase of seismic waves traveling from a seismic source location to each of a plurality of seismic receiver locations; and
    a seismic processing system comprising a computer processor, wherein the seismic processing system is configured to:
        receive the seismic data based on a seismic survey of a geological region of interest,
        receive a velocity model comprising a velocity at each of a plurality of grid nodes, wherein the plurality of grid nodes represents the geological region of interest,
        receive an attenuation model comprising an attenuation factor at each of the plurality of grid nodes,
        determine a traveltime model using the seismic source location, the velocity model, and a traveltime Eikonal function, wherein the traveltime model comprises a traveltime at each of the plurality of grid nodes,
        determine an attenuated traveltime model using a parallel fast sweeping method,
            wherein the attenuated traveltime model comprises an attenuated traveltime at each of the plurality of grid nodes;
            wherein the parallel fast sweeping method comprises Cuthill-McKee ordering the plurality of grid nodes into a plurality of levels for each of a plurality of sweeps;
            wherein the parallel fast sweeping method further comprises using the seismic source location, the velocity model, the attenuation model, the traveltime model, and an attenuated traveltime Eikonal function; and wherein the attenuated traveltime at each of the plurality of grid nodes within each of the plurality of levels are determined in parallel, and generate an updated attenuation model regarding the geological region of interest using the attenuated traveltime model, the amplitude, and the phase.

14. The system of claim 13, wherein the seismic processing system is further configured to determine a seismic image using the seismic data and the updated attenuation model.

15. The system of claim 14, further comprising a seismic interpretation workstation configured to identify a hydrocarbon reservoir within the geological region of interest using the seismic image.

16. The system of claim 13, wherein the computer processor comprises a graphics processing unit (GPU), wherein the attenuated traveltime at each of the plurality of grid nodes within each of the plurality of levels are determined in parallel using the GPU.

17. The system of claim 13, wherein the seismic processing system is further configured to:
define the traveltime for a first grid node among the plurality of grid nodes as zero, wherein the first grid node represents the seismic source location;
initialize the traveltime for each of the plurality of grid nodes except the first grid node as a positive value; and
determine an updated traveltime for each of the plurality of grid nodes except the first grid node using a fast sweeping method until a convergence criterion is satisfied.

18. The system of claim 13, wherein the seismic processing system is further configured to:
define the attenuated traveltime for a first grid node among the plurality of grid nodes as zero, wherein the first grid node represents the seismic source location;
initialize the attenuated traveltime for each of the plurality of grid nodes except the first grid node as a positive value; and
determine an updated attenuated traveltime for each of the plurality of grid nodes except the first grid node using the parallel fast sweeping method until a first convergence criterion is satisfied.

19. The system of claim 13, wherein Cuthill-McKee ordering comprises assigning each of the plurality of grid nodes to each of the plurality of levels based on an index of each of the plurality of grid nodes in a coordinate system.

20. The system of claim 13, wherein each of the plurality of sweeps reassigns each of the plurality of grid nodes to each of the plurality of levels based on a new index of each of the plurality of grid nodes in a transformed coordinate system.

* * * * *